April 14, 1970     E. A. KOLM ET AL     3,506,956
AUTOMOBILE RECOGNITION SYSTEM
Filed April 10, 1968     2 Sheets-Sheet 1
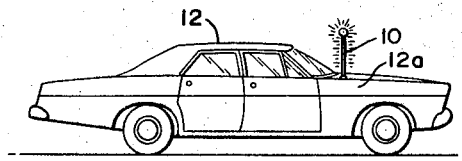
FIG. 1
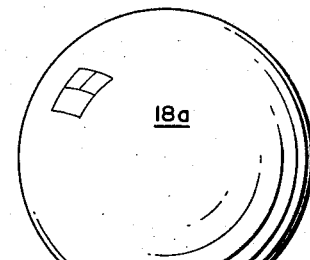
FIG. 2
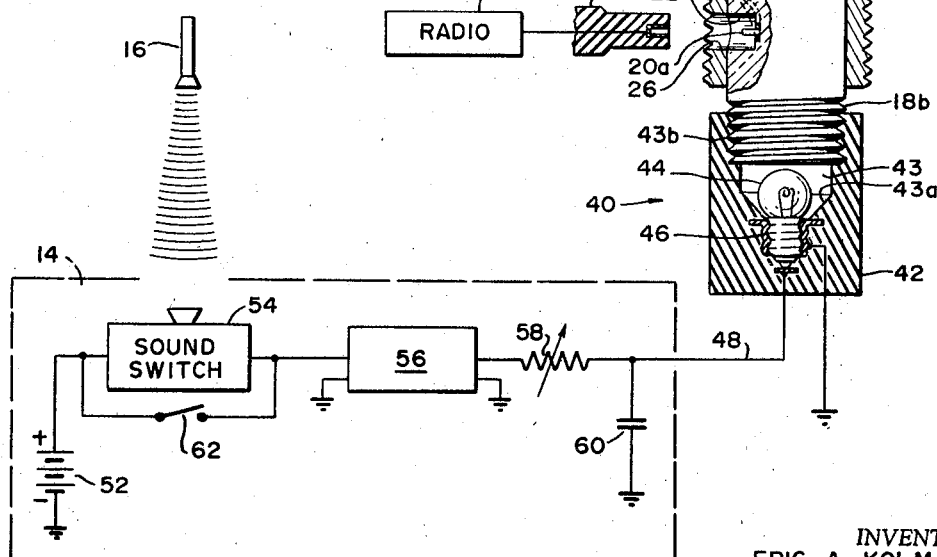
INVENTORS
ERIC A. KOLM
JOHN J. HARRIS
BY
*Blair Buckles Cesari & St. Onge*
ATTORNEYS INVENTORS
ERIC A. KOLM
JOHN J. HARRIS
BY
Blair Buckles Cesari & St. Onge
ATTORNEYS

United States Patent Office 3,506,956
Patented Apr. 14, 1970

3,506,956
AUTOMOBILE RECOGNITION SYSTEM
Eric A. Kolm, Brookline, and John J. Harris, Millis,
Mass., assignors to Sonus Corporation, Natick, Mass.
Filed Apr. 10, 1968, Ser. No. 720,061
Int. Cl. H04b 11/00
U.S. Cl. 340—15          15 Claims

ABSTRACT OF THE DISCLOSURE

An automobile recognition system employs an illuminating automobile fixture which, when turned on, emits a characteristic recognition signal to enable an owner to locate his car. An acoustical switch turns on the fixture in response to inaudible whistle blasts of a selected frequency produced by the owner in the general vicinity of his car.

BACKGROUND OF THE INVENTION

This invention relates to a vehicle recognition system. It relates more particularly to a fixture for a vehicle which may be controlled from a remote location to emit signals to enable one to discern his own vehicle from a multitude of others in the same area.

Due to the ever increasing number of automobiles on the road of the same color, model and make, it is becoming more and more difficult to single out one's own car from all the other similar cars in a parking lot or on the street, especially at night. This is particularly so when one patronizes one of the very large suburban shopping centers whose lots may contain as many as one thousand cars at a time. While these large lots are normally divided into numbered sections to enable the patron to more easily locate his car, the customers frequently forgets the section number by the time he is ready to leave. This same problem arises also when a traveler parks his car in an airport or railroad parking lot and leaves for a relatively long period. By the time he returns, he may have forgotten completely where in the lot he parked his car.

SUMMARY OF THE INVENTION

Accordingly, an object of this invention is to provide a vehicle recognition system which enables one to more easily locate his vehicle from among others in the same area.

A further object of the invention is to provide signaling apparatus for an automobile which is operated by remote control to enable the owner to distinguish his own car from other similar cars around it.

Another object of the invention is to provide an automobile antenna which flashes in a predetermined manner to permit the automobile owner to distinguish his car from other cars employing similar illuminated antennae.

Another object of the invention is to provide a fixture for an automobile which illuminates in response to an acoustical signal of a selected frequency emitted from a distance.

A still further object of the invention is to provide a remote controlled recognition system for an automobile which does not respond readily to spurious signals.

Other objects of the invention will in part be obvious and will in part appear hereinafter.

The invention accordingly comprises the features of construction, combination of elements and arrangement of parts which will be exemplified in the construction hereinafter set forth, and the scope of the invention will be indicated in the claims.

Briefly, the present system comprises an upstanding, rod-like radio antenna which is mounted on the automobile body in the usual way. The antenna body is a rod of fiber glass or other comparable flexible material which is transparent or partially translucent. An antenna wire embedded in the rod extends the length of the rod and terminates in a fixture which may be coupled to a coaxial connector leading to the automobile radio.

A light is mounted in the base of the plastic rod. When this light is turned on, the entire rod is illuminated and is readily visible from a distance. A sound-operated switching circuit controls the light in response to an acoustical signal of a predetermined frequency supplied by a sound transmitter, such as a dog whistle. Thus, even if he is relatively far away from his car, by blowing on the whistle, the owner can illuminate the antenna and thereby locate his car.

The present system is relatively selective in that it responds only to sounds of a predetermined frequency supplied by the owner's own transmitter. Also, in a preferred system embodiment, there is provision for flashing the antenna at a predetermined rate so that the owner can more easily recognize his particular car antenna from similar antennae installed on other cars in the area. Additionally, each antenna may be colored and bear an illuminating shape or ornament at the top to further help to distinguish it. Thus, there is relatively little chance of the car owner being attracted to another's similarly equipped automobile because it is highly unlikely that two cars having exactly the same response frequency, flash rate, color and ornament shape would be present in the same lot at the same time.

The present system may also be actuated manually from inside the car so that the flashing antenna may serve as a breakdown warning when the car is disabled on the road.

BRIEF DESCRIPTION OF THE DRAWINGS

For a fuller understanding of the nature and objects of the invention, reference should be had to the following detailed description taken in connection with the accompanying drawings, in which:

FIG. 1 is a side elevational view of an automobile equipped with a vehicle recognition system made in accordance with this invention;

FIG. 2 is an enlarged elevational view with parts in section and other parts in schematic form showing in greater detail the elements of our system.

DESCRIPTION OF THE PREFERRED EMBODIMENTS

Figure 3:
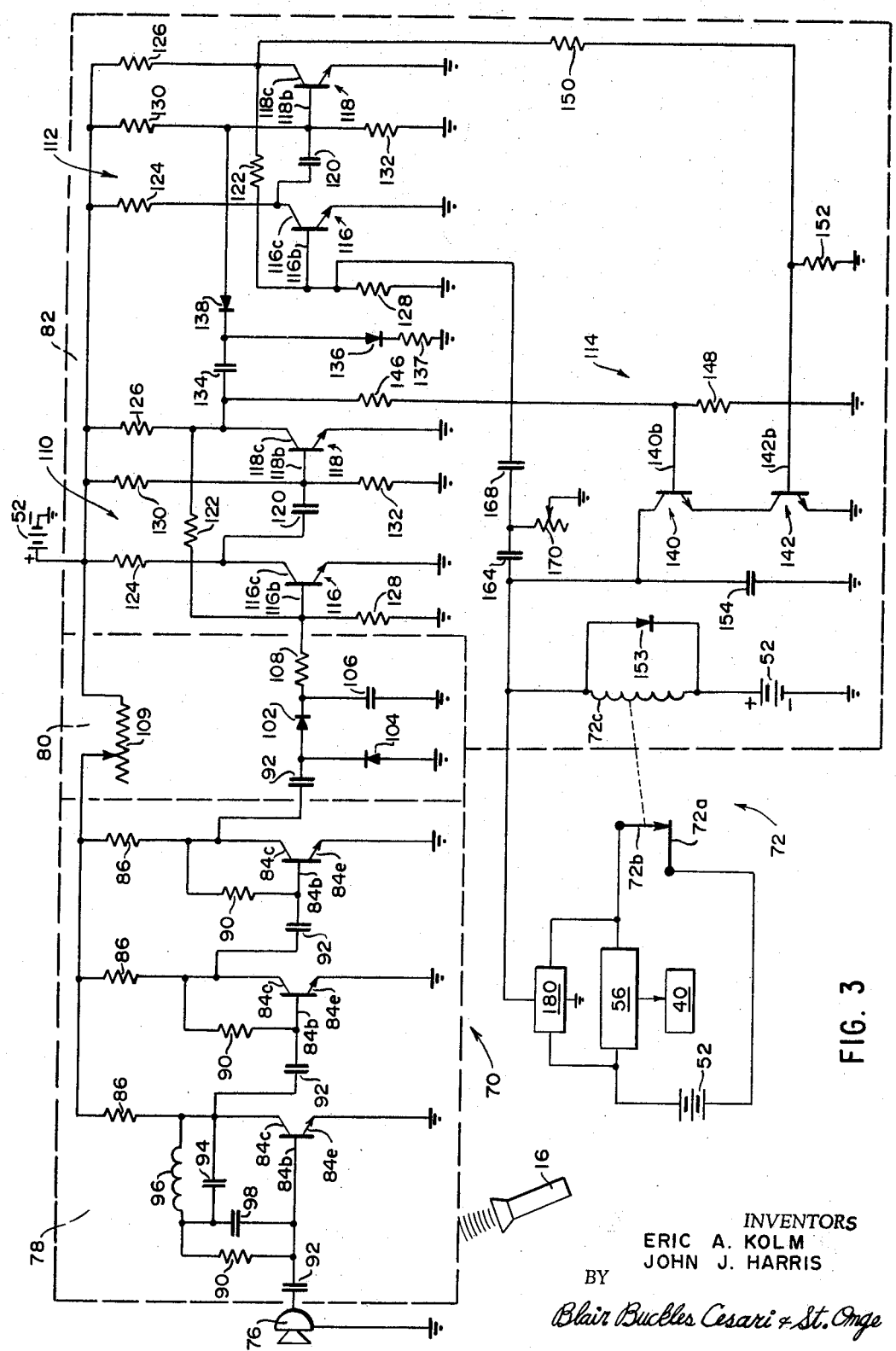
FIG. 3 is a schematic diagram showing in greater detail the acoustical switch used in the present system.

Referring to FIG. 1 of the drawings, our system includes an illuminating antenna 10 extending up from the front fender 12a of an automobile 12. A control circuit 14 (FIG. 2) responsive to acoustical signals from a sound transmitter, in the form of a whistle 16 (FIG. 2), energizes antenna 10 so that it emits flashing signals of a characteristic color and/or repetition rate. This enables the owner of car 12 to single out his automobile from other cars in a large and crowded parking area, even though they may be equipped with a similar system. That is, the recognition systems on these other vehicles would respond to different frequencies and flash differently.

A whistle 16 commonly used to call dogs is preferred here because it emits an inaudible signal having a specific frequency which travels a relatively long distance. Moreover, it is small, lightweight, inexpensive and requires no internal power source. Of course, in some applications the actuating sound may be produced in other ways.

The system may also be turned on by a switch inside car 12 so that the antenna emits light flashes continuously to serve as a warning in the event that the car becomes disabled on the road.

Referring now to FIG. 2, antenna 10 comprises a relatively long rod 18 of fiber glass or other similar flexible, resilient, transparent, insulating material. The upper end of rod 18 terminates in a relatively large ball 18a made of a similar material.

An antenna wire or ribbon 20 embedded in rod 18 spirals down to a terminal 20a which projects into an opening 22 formed in the side of rod 18 near its lower end 18b.

A conductive flanged bushing 24 engages around rod 18 and is permanently secured to the rod by cement or other suitable means. Bushing 24 is exteriorly threaded at 24a and has a side opening 26 in register with opening 22 in rod 18.

When mounting antenna 10 on automobile 12, rod 18 and bushing 24 are inserted through an opening 28 in fender 12a. The bushing 24 flange is tightened down on fender 12a by means of a threaded nut 32 which is engaged over the end of rod 18 below fender 12a and screwed down on bushing 24 until the antenna is rigidly fixed to fender 12a.

A coaxial connector 34 connected to a radio 36 in automobile 12 frictionally engages in openings 22 and 26 in antenna 10. The inner conductor of connector 34 contacts terminal 20a in antenna 10. The outer conductor of the connector is grounded through bushing 24, nut 32 and fender 12a.

A lamp indicated generally at 40 is attached to rod 18. Lamp 40 comprises a housing 42 made of plastic or other insulating material attached to the bottom end of the rod. Housing 42 has an opening in one side whose bottom wall is dished at 43a. An electric light bulb 44 is mounted in a conventional electrical socket 46 molded into housing 42 adjacent this bottom wall 43a. The wall of recess 43 in housing 42 is threaded at 43b so that the housing can be screwed onto rod end 18b which is also threaded accordingly. Thus, the housing may be removed easily from the rod to replace bulb 44 when it wears out.

Control circuit 14 is connected by way of an electric lead 48 to one terminal of socket 46; the other terminal thereof is grounded.

When bulb 44 is energized, the light emanating therefrom is transmitted through the entire length of the rod 18 and into the ball 18a. Consequently, the entire antenna 10 becomes a highly-visible beacon. Even when rod 18 is flexed or bent, the light reflects back and forth from the sides of rod 18 (or of the individual fibers comprising the rod) so that the entirety of rod 18 and ball 18a are relatively brightly illuminated.

Preferably, bulb 44 is, as illustrated, a gas discharge type bulb which is flashed on and off providing short bursts of intense light. This type of bulb is desirable because it requires a minimum of power. However, in some applications a conventional incandescent bulb would work equally well.

Still referring to FIG. 2, control circuit 14 includes a source of D.C. voltage illustrated here by a battery 52 which may be the car battery. A sound-operated switch 54, a conventional high voltage circuit 56, variable resistor 58 and capacitor 60 are all connected in series with battery 52, and lamp 40, on the other hand, is connected in parallel with capacitor 60. Circuit 56 may comprise, for example, a D.C. to A.C. converter followed by a step up transformer followed by a rectifier or it may be simply a bank of capacitors. If an incandescent bulb is used in lamp 40, a conventional auto lamp flasher may be employed in lieu of elements 56, 58 and 60.

When the automobile owner wishes to locate his car, he need only come within range of the system and blow on whistle 16. The whistle emits an acoustical signal which is detected by switch 54. Switch 54 closes, thereby energizing circuit 56. The output of circuit 56 is a large direct voltage which charges up capacitor 60 through variable resistor 58. The capacitor charges until the breakdown voltage of bulb 44 is reached, whereupon the capacitor discharges through bulb 44, causing the latter to emit a short burst of light which illuminates the entire antenna 10. Immediately, capacitor 60 begins recharging and the process is repeated so that antenna 10 emits successive short bursts of light as long as circuit 14 is energized.

As soon as the operator locates his car, he blows on whistle 16 again. The resulting acoustical signal is again detected by switch 54 which opens, thereby deenergizing circuit 14. Alternatively, the lamp 40 may be controlled to extinguish automatically as will be described later.

The illustrated system is only responsive to signals of the particular frequency produced by whistle 16. However, when a large number of automobiles are equipped with our system, is could occur that several systems installed on cars in the same parking area might respond to the same frequency. To avoid confusion, the rate at which the antena flashes is selectively controlled by adjustment of variable resistor 56. This resistance affects the charging rate of capacitor 58 which, in turn, controls the time interval between flashes of bulb 44. Therefore, the car 12 owner can adjust resistor 56 to give antenna 10 a particular flash repetition rate to enable him to distinguish his antenna from similar antennas which are flashing at different rates.

A manual switch 62 connected in parallel with switch 54 is mounted inside car 12. By closing switch 62, the operator can cause antenna 10 to flash continuously so that it can serve as a breakdown warning in the event his car becomes disabled on the road.

Additional means may be employed to enhance the uniqueness of the recognition signal emitted by each system. For example, coloring may be incorporated into all or part of rod 18 so that when it is illuminated, it gives off a distinctive color pattern. Also, ornament 18a at the top of rod 18 may also have its own distinctive color or shape.

One preferred embodiment of our system employs a sound switch 54 which only responds to signals from whistle 16 when they are emitted in a predetermined sequence. This further minimizes the chances of confusion between cars equipped with the same system. Such a switch is illustrated in FIG. 3 of the drawings. It comprises a receiver, generally indicated at 70, having an impulse relay 72 whose contacts 72a and 72b are closed or opened in response to signals from whistle 16. Receiver 70 contains an acoustical receiving transducer 76 whose output is amplified by a frequency selective amplifier 78 and then rectified by a rectifier 80 prior to processing by a counting circuit 82.

The amplifier 78 includes three common-emitter transistor stages employing transistors 84, with load resistors 86 between the collectors 84c and battery 52. The emitters 84e are grounded and biasing resistors 90 are connected between the collectors 84c and the bases 84b. The input signal for each stage is obtained by way of a coupling capacitor 92. In the event that transducer 76 is a piezoelectric capacitive type, capacitor 92 at the input to the first amplifier stage may be eliminated. In a representative amplifier, the transistors 84, resistors 86 and 90, and coupling capacitors 92 are identical among the three stages, thereby simplifying construction and the stocking of parts.

The first stage of the amplifier 78 also includes a frequency selective negative feedback network comprising a capacitor 94 and an inductor 96 connected in parallel between the biasing resistor 90 and collector 24c of this stage. A further capacitor 98 is in parallel with the resistor 90. The capacitor 94 and inductor 96 resonate, along with other capacitances in the inductor and transistor 84, at the frequency at which the response of the amplifier is "peaked." Preferably, this is beyond the upper end of the audible range. At this selected frequency, negative feedback in the first stage of the amplifier 78 is negligible.

At other frequencies, on the other hand, the impedance of the parallel tuned circuit is materially less, so that a substantial negative feedback signal is returned to the base 84b by way of the capacitor 98, thereby reducing the gain of the stage at these latter frequencies. An additional drop-off in amplifier response at frequencies below the peak frequency is provided by means of the coupling capacitors 92, whose capacitances are small enough to substantially diminish the coupling of signals to the individual amplifier stages at these lower frequencies. The rapid drop-off in gain at the lower frequencies essentially eliminates any response the system might have to interfering signals in the normal voice and radio program range. It also eliminates most other acoustical interference, substantially all of which is well within the audible frequency range.

The rectifier 80 preferably takes the form of a voltage doubler comprising a coupling capacitor 100, a series diode 102, a shunt diode 104 and a shunt capacitor 106. These elements are followed by a series resistor 108 connected to the counting circuit 82.

A sensitivity adjustment in the form of a variable resistor 109 is connected between load resistor 86 and battery 52. The adjustment of resistor 109 changes the voltage across transistors 84 and, hence, alters the gain of amplifier 78. Thus, by properly adjusting resistor 109, the switch can be made to respond to a selected sound level.

The counting circuit 82 includes a pair of monostable or one-shot multivibrators 110 and 112 and a coincidence circuit generally indicated at 114 arranged to provide a signal indicative of the coincidence of the unstable states of the two multivibrators. The multivibrators 110 and 112 are essentially identical except for their time constants, the multivibrator 112 preferably having the longer time constant. Thus, each multivibrator includes a pair of grounded emitter transistors 116 and 118, with a coupling capacitor 120 connected between the collector 116c and the base 118b and a coupling resistor 122 between the collector 118c and the base 116b. Each circuit also includes collector load resistors 124 and 126 and biasing resistors 128, 130 and 132. The collector 118c of the multivibrator 110 is coupled to the base 118b of the multivibrator 112 by means of a capacitor 134 followed by a shunt diode 136 and resistor 137 and a series diode 138.

The coincidence circuit 114 comprises a pair of transistors 140 and 142 whose collector-emitter current paths are in series with coil 72c of relay 72 and battery 52. The base 140b is connected to receive the signal from the collector 118c of the multivibrator 110 by way of a voltage divider comprising resistors 146 and 148. Similarly, the base 142b receives a signal from the multivibrator 112 by way of a voltage divider comprising resistors 150 and 152. When both transistors 140 and 142 are turned on, they provide a conducting path from the battery 52 to ground by way of the relay coil 72c, thereby opening or closing the relay contacts 72a. A diode 153 is connected across relay coil 72c to protect the transistors 140 and 142. Also, a capacitor 154 is connected across transistors 140 and 142 to protect these elements from current pulses which might damage them. This enables relatively inexpensive transistors to be used in circuit 114.

Operation of the counting circuit 82 is is follows. Initially, the multivibrators 110 and 112 are in their stable states, with the transistors 118 conducting and the transistors 116 turned off. Thus, the collectors 118c are essentially at ground potential and the collectors 116c are at the potential of the battery 52. Both the transistors 140 and 142 in the coincidence circuit 114 are thus nonconducting by virtue of the ground potential at their bases.

If, then, a signal within the pass band of the amplifier 78 is received by the transducer 76, resulting rectification of the signal by the rectifier 80 will provide a positive rectifier output which is passed to the base 116b of the multivibrator 110 by way of the resistor 108. This triggers the multivibrator, thereby causing the transistor 116 therein to conduct and cutting off the transistor 118. The collector 118c in the multivibrator 110 thus rises to the potential of the battery 52. The base 140b in the coincidence circuit 114 is thereby provided with a positive voltage, but without simultaneous conduction in the transistor 142, the coincidence circuit does not energize the relay coil 72c.

At the same time, the diode 136 conducts so that the voltage across the capacitor 134 can follow the potential on the collector 118c in the multivibrator 110. The diode 138 prevents positive-going signals such as this from reaching the base 118b in the multivibrator 112.

If the incoming signal is then interrupted, the multivibrator 110 will eventually return to its stable state, and the resulting negative-going signal at its collector 118c will be passed by the capacitor 134 and diode 138 to trigger the multivibrator 112. There will thus be a positive potential at the base 142b in the coincidence circuit 114, but with the multivibrator 110 now back in its stable state, the base 140b will lack the potential for operation of the coincidence circuit.

If a further signal within the pass band of the amplifier 78 is then received while the multivibrator 112 is still in its unstable state, it will cause the multivibrator 110 to shift to its unstable state, as before. Both the bases 140b and 142b in the coincidence circuit 114 will then have positive potentials and both the transistors 140 and 142 will be turned on to provide conduction through the relay coil 72c.

The relay 72 is an impulse type relay. Each time the current pulse passes through the coil 72c, the condition of the contacts 72a and 72b is changed. That is, if the contacts are closed, the current pulse causes them to open, and if they are open, it causes them to close. Thus, the reception of two properly spaced signals within the pass band of the amplifier 78 will, in the first instance, cause the counting circuit 82 to close the contacts 72a and 72b to connect lamp 40 to battery 52. The reception of two more properly spaced signals will then cause the counting circuit 82 to again energize the relay 72 to open the contacts 72a and 72b, thereby disconnecting the lamp 40 from the battery.

We also provide a desensitizing arrangement to prevent undesirable recycling of the system due to noises created by the opening of relay contacts 72a and 72b. More particularly, a pair of capacitors 164 and 168 are connected between the base 116b in multivibrator 112 and the junction of relay coil 72c and capacitor 154.

Also, a variable resistor 170 connected between ground and the junction of capacitors 164 and 168 serves as a reset adjustment by which the time interval during which counter 112 is desensitized may be controlled. When transistors 140 and 142 are both turned on, the base 116b in multivibrator 112 is grounded through them. This imposes the stable state on multivibrator 112 so that even if relay 72 emits a combination of sounds which are passed by amplifier 78 and would normally trigger counter 82, the counter does not respond to these spurious signals. As soon as multivibrator 112 assumes its stable state, transistor 140 in coincident circuit 114 is turned off. However, base 116b in multivibrator 112 remains at or near ground potential until capacitors 164 and 168 charge up by way of variable resistor 170. By varying resistor 170, this charging time can be altered so that the user can select the optimum time duration for the desensitization of counter 82.

There is always a possibility that a given parking lot may contain two or more cars equipped with identical systems which respond to identical acoustical signals and emit identical recognition patterns. When the owner of one of these cars actuates his own system, there is a remote possibility that he will also turn on the systems in these other cars. These other systems would then remain on after he leaves the lot. To take care of this eventuality, a timing switch 180 is connected in parallel with lamp 40. Timer 180 is energized when relay 72 closes. It counts for a sufficient time to enable the owner to find his car, e.g. three minutes, and then closes, thereby connecting the upper end of coil 72a to ground, which opens the relay. Thus, the lamp 40 in all the systems, including his own, will go out after three minutes.

From the foregoing description of the counting circuit 82, it will be apparent this circuit is insensitive to a continuous acoustical signal in the pass band of the amplifier 78. A signal of this type will trigger the multivibrator 110, but will also prevent it from returning to its stable state to trigger the multivibrator 112. Thus, there will be no coincidence of the unstable states of the two multivibrators as required for actuation of relay 72.

The counting circuit also discriminates against a succession of acoustical signals which are spaced too far apart. The first of such signals will trigger the multivibrator 110, which will then trigger the multivibrator 112 upon returning to its stable state. However, the multivibrator 112 will return to its stable state before the second signal triggers the multivibrator 110. Thus, again there will be no coincidence of the unstable states of the two multivibrators. Finally, a pair of signals spaced too close together will fail to actuate the relay 72, since the second signal will occur before the multivibrator 110 has returned to its stable state and thus will not trigger this multivibrator the second time, as required by the counting circuit 82.

By way of example, the time constants of the two multivibrators may be arranged so that the vibrator 110 remains in its unstable state 0.2 second after being triggered, and the multivibrator 112 remains in the unstable state 0.5 second after it is triggered.

It will be apparent that the illustrated switch may readily be extended to count three input signals instead of two by merely adding a third monostable circuit triggered by the return of the multivibrator 112 to its stable state and adding to the coincidence circuit 114 a further transistor biased to conduct when the third multivibrator is in its unstable state. The same logical arrangement may be used for an even greater number of input signals if desired.

It will be seen from the foregoing then that our recognition system greatly eases the burden of the car owner in locating his car from among a multitude of other similar cars in a parking lot. The present system responds only to the owner's particular transmitting frequency to eliminate the possibility of the system being accidentally turned on by others.

Further, even though there may be many cars equipped with a similar recognition system, each owner can easily distinguish the particular illuminated signal emitted by his own system by virtue of its unique combination of response frequency, flash rate and the color and shape of the associated antenna.

It will thus be seen that the objects set forth above among those made apparent from the preceding description are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:

1. A vehicle recognition system comprising
   (A) means for producing an electrical signal in response to only a relatively high frequency whistle emitted from a relatively remote location,
   (B) an electrical fixture
      (1) for mounting on said vehicle,
      (2) being connected for being energized by said electrical signal, and
      (3) emitting a characteristic recognition signal detectable at said remote location when it is energized by said signal producing means, and
   (C) means adapted to be carried on the person for emitting a relatively high frequency whistle for actuating said signal producing means.

2. A recognition system as defined in claim 1 wherein said fixture comprises a light source which illuminates when energized by said signal producing means.

3. A recognition system as defined in claim 2 wherein said signal producing means includes means for controlledly interrupting said signal from said signal producing means to said light source so that said source emits light flashes having a predetermined repetition rate.

4. A recognition system as defined in claim 2 wherein said light source is an automobile radio antenna comprising
   (A) an upstanding rod of transparent insulating material,
   (B) an antenna wire extending along said rod, and
   (C) a light bulb
      (1) positioned at the lower end of said rod,
      (2) being energized by said electrical signal, the light emitted by said bulb being transmitted through substantially the entire length of said rod.

5. A recognition system as defined in claim 4 wherein said rod has a selected color pattern.

6. A recognition system as defined in claim 4 and further including a transparent ornament affixed to the top of said rod.

7. A recognition system as defined in claim 2 and further including means for deenergizing said light source after a predetermined time interval.

8. A recognition system as defined in claim 2 wherein said signal producing means also includes a switch
   (A) for mounting in said vehicle, and
   (B) operable to energize said fixture independently of the signal from said actuating signal emitting means so that said fixture emits a continuous characteristic warning signal.

9. An automobile recognition system comprising
   (A) an antenna projecting up from said automobile, said antenna comprising
      (1) a transparent or translucent rod, and
      (2) a light source mounted near the lower end of said antenna,
   (B) a source of power,
   (C) a control circuit connected between said power source and said light source, said control circuit comprising a switch responsive to only relatively high frequency whistles for turning on said light source, the light emitted by said source being transmitted by said rod, and
   (D) means carried on the person for emitting a relatively high frequency whistle.

10. A recognition system as defined in claim 9 wherein said switch includes a filter which makes it responsive only to acoustical signals of a selected frequency.

11. A recognition system as defined in claim 10 wherein said switch includes a decoder so that it responds only to a determined sequence of said selected frequency signals.

12. A recognition system as defined in claim 10 and further including means for deenergizing said light source after a determined time interval.

13. A recognition system as defined in claim 10 wherein said control circuit includes means for periodically deenergizing said light source so that said antenna emits light flashes having a determined repetition rate.

14. A recognition system as defined in claim 13 and further including a transparent ornament mounted on the upper end of said rod.

15. A recognition system as defined in claim 9 wherein
(A) said light source comprises a gas discharge lamp, and
(B) said control circuit includes means for producing a high voltage D.C. signal for illuminating said lamp.

References Cited

UNITED STATES PATENTS

| | | | |
|---|---|---|---|
| 2,420,772 | 5/1947 | Dalton | 343—721 X |
| 2,744,189 | 5/1956 | Wudyka | 340—87 X |
| 2,806,913 | 9/1957 | Grigull | 181—.5 X |
| 3,108,277 | 10/1963 | Thomas | 343—721 |
| 3,138,778 | 6/1964 | Dulin | 340—15 |
| 3,377,616 | 4/1968 | Auer | 343—6.5 X |

FOREIGN PATENTS 631,601  11/1949  Great Britain.

RICHARD A. FARLEY, Primary Examiner

U.S. Cl. X.R.

181—.5; 240—8.1; 340—89, 148; 343—721